US008504753B2

(12) United States Patent
Danko

(10) Patent No.: US 8,504,753 B2
(45) Date of Patent: Aug. 6, 2013

(54) SUSPENDABLE INTERRUPTS FOR PROCESSOR IDLE MANAGEMENT

(75) Inventor: Attilla Danko, Nepean (CA)

(73) Assignee: QNX Software Systems Limited, Kanata (CA)

(*) Notice: Subject to any disclaimer, the term of this patent is extended or adjusted under 35 U.S.C. 154(b) by 205 days.

(21) Appl. No.: 13/026,930

(22) Filed: Feb. 14, 2011

(65) Prior Publication Data

US 2012/0210104 A1     Aug. 16, 2012

(51) Int. Cl.
*G06F 1/32* (2006.01)
*G06F 13/24* (2006.01)

(52) U.S. Cl.
CPC .............. *G06F 1/3203* (2013.01); *G06F 13/24* (2013.01)
USPC .......................................... 710/262; 713/323

(58) Field of Classification Search
USPC ........................................................ 713/310
See application file for complete search history.

(56) References Cited

U.S. PATENT DOCUMENTS

| | | | | |
|---|---|---|---|---|
| 5,613,129 A * | 3/1997 | Walsh | | 710/267 |
| 5,881,296 A * | 3/1999 | Williams et al. | | 710/263 |
| 6,161,187 A | 12/2000 | Mason et al. | | 713/322 |
| 6,189,066 B1 * | 2/2001 | Lowe et al. | | 710/260 |
| 6,189,067 B1 * | 2/2001 | Lowe et al. | | 710/260 |
| 6,934,783 B2 * | 8/2005 | Muller et al. | | 710/260 |
| 7,043,649 B2 * | 5/2006 | Terrell, II | | 713/322 |
| 7,225,346 B2 * | 5/2007 | Kawano et al. | | 713/300 |
| 7,389,438 B2 * | 6/2008 | Watts, Jr. | | 713/323 |
| 7,478,186 B1 * | 1/2009 | Onufryk et al. | | 710/263 |
| 7,624,215 B2 * | 11/2009 | Axford et al. | | 710/260 |
| 7,725,750 B2 * | 5/2010 | Ashish et al. | | 713/323 |
| 7,765,352 B2 * | 7/2010 | Pudipeddi et al. | | 710/261 |
| 8,065,547 B2 * | 11/2011 | Chang et al. | | 713/330 |
| 2003/0065854 A1 * | 4/2003 | Bohm et al. | | 710/260 |
| 2007/0240003 A1 * | 10/2007 | Watts, Jr. | | 713/322 |
| 2008/0028240 A1 * | 1/2008 | Arai et al. | | 713/300 |
| 2009/0319810 A1 * | 12/2009 | Aoyama | | 713/300 |
| 2009/0327553 A1 * | 12/2009 | Fletcher | | 710/262 |
| 2010/0218183 A1 * | 8/2010 | Wang et al. | | 718/1 |
| 2011/0106993 A1 * | 5/2011 | Arinobu et al. | | 710/262 |
| 2011/0213906 A1 * | 9/2011 | Gustafsson et al. | | 710/262 |
| 2012/0144081 A1 * | 6/2012 | Smith et al. | | 710/269 |
| 2012/0210032 A1 * | 8/2012 | Wang et al. | | 710/260 |

FOREIGN PATENT DOCUMENTS

EP    2166457    3/2010

OTHER PUBLICATIONS

Extended European Search report dated Jun. 21, 2011. In corresponding application No. 11154292.4.

* cited by examiner

*Primary Examiner* — Ryan Stiglic
(74) *Attorney, Agent, or Firm* — Novak Druce Connolly Bove + Quigg LLP

(57) ABSTRACT

Suspendable interrupts are described that allow a processor to remain in an idle state for a longer period of time. Each suspendable interrupt defines a maximum delay value that specifies the maximum delay software associated with the interrupt can wait between a receipt of an interrupt signal associated with the suspendable interrupt and raising the interrupt for servicing by the software. The delay value allows suspendable interrupts to be masked when a processor is placed in the idle state if they can be dealt with at a next scheduled wake time of the processor, allowing the processor to potentially remain in the idle state for a longer period of time.

23 Claims, 6 Drawing Sheets

| | Timer | Trigger Time |
|---|---|---|
| 502 | Timer 1 | 0.6 |
| | Timer 2 | 0.4 ← Processor wake time |
| | Timer 3 | 1.5 |
| | Suspendable interrupt | Max. delay | Mask state |
|---|---|---|---|
| 504 | Suspendable interrupt 1 | 0.5 | Masked |
| | Suspendable interrupt 2 | 1.2 | Masked |
| | Suspendable interrupt 3 | 0.3 | Unmasked |
Figure 5a
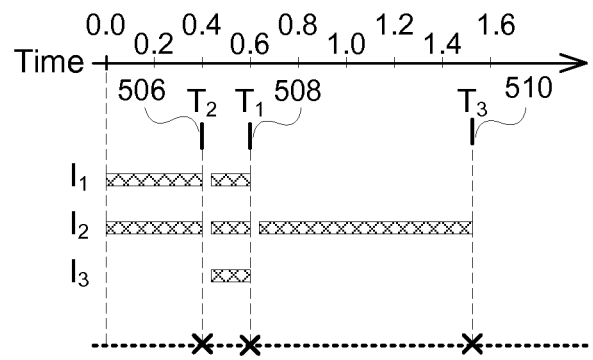
Figure 5b
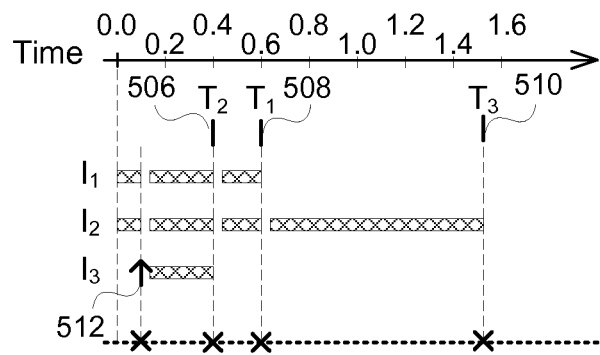
Figure 5c

SUSPENDABLE INTERRUPTS FOR PROCESSOR IDLE MANAGEMENT

RELATED APPLICATIONS

This application is related to concurrently filed United States Patent Application and titled "Tolerant Timers for Processor Idle Management" commonly owned by the applicant, having application Ser. No. 13/026,837, the content of which is hereby incorporated by reference in its entirety.

TECHNICAL FIELD

The following description relates to processor idle management and in particular to the use of interrupts.

BACKGROUND

Power management in electronic devices, particularly portable electronic devices, is important when power resources such as battery life are limited. Processors used in electronic devices generally have two or more states in which they can operate. In a wake state the processor consumes power when executing software. In an idle state the processor performs minimal, if any, processing and consequently consumes less power which is useful in extending battery life. Processors may be switched between the wake and idle state for very short durations of time in an effort to conserve power when no processing tasks are required to be performed by the processor.

Operating systems (OS) allow multiple applications to be executed on a processor by scheduling the execution of the applications. If no applications require processing the OS may place the processor into the idle state. Before placing the processor into the idle state, the OS sets a time at which the processor is to switch to the wake state. The wake time may be set by the OS based on a periodic timer or may be set based on timers requested by an application or the OS.

An interrupt can be associated with software or processing that is to be done when the interrupt occurs. Interrupts may be generated as a result of external events and as such the timing of their occurrence is unknown in advance. When an interrupt occurs, and the processor is in an idle state, the interrupt causes the processor to switch to the wake state to service the interrupt. FIG. 1 depicts in a timeline the occurrence of timers T1, T2, T3, T4 as well as interrupts I1, I2, I3 and the associated switches between the idle state, which is represented by the dotted line, and wake state, represented by 'X'. In FIG. 1, it is assumed for clarity that the processor returns to the idle state after switching to the wake state with minimal delay. As is apparent from FIG. 1, each time a timer or an interrupt occur, the processor is switched from the idle state to the wake state.

It is desirable to have interrupts that enable an increase in the amount of time a processor spends in the idle state.

BRIEF DESCRIPTION OF THE DRAWINGS

Embodiments are described herein with reference to the appended drawings, in which:

FIG. 5a depicts a timer schedule table and a suspendable interrupt table;

FIG. 5b depicts in a timeline, the timers according to the timer schedule table of FIG. 5a;

FIG. 5c depicts in a further timeline, the timers according to the timer schedule table of FIG. 5a and a received interrupt signal;

DETAILED DESCRIPTION

Figure 1:
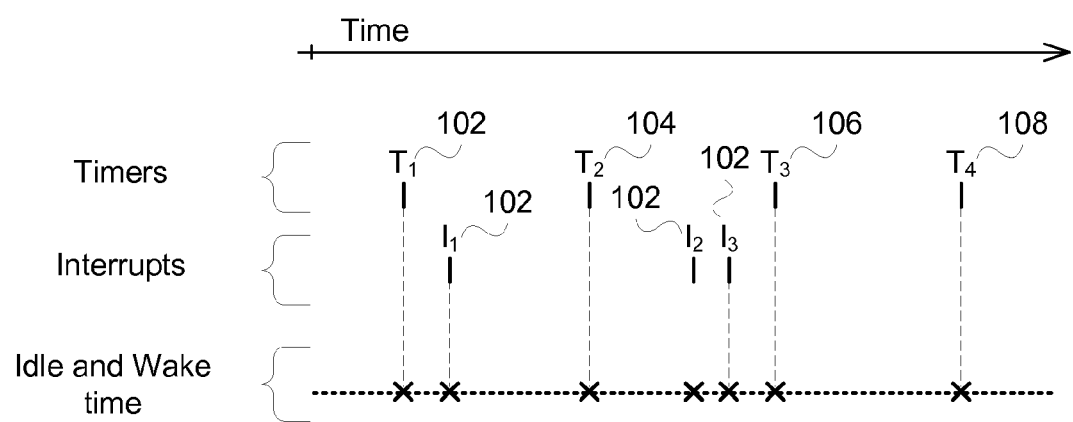
FIG. 1 depicts in a timeline, the occurrence of timers as well as interrupts and the associated switches between the idle state and wake state.

In accordance with an aspect of the present disclosure there is provided method of extending a processor idle state in an electronic device, the method comprising determining that the processor can be placed into an idle state, setting a processor-wake time based on a timer schedule, masking a suspendable interrupt having a maximum-delay value, when a current time plus the maximum-delay value occurs after the set processor-wake time, and placing the processor into the idle state.

In accordance with an aspect of the present disclosure there is further provided an electronic device comprising a processor executing instructions, a memory storing instructions for execution by the processor, the instructions when executed by the processor configuring the electronic device to provide an operating system for setting a processor-wake time, before the processor is placed into an idle state, based on a timer schedule and placing the processor into the idle state, and a suspendable interrupt control for masking a suspendable interrupt having a maximum-delay value, when a current time plus the maximum-delay value occurs after the set processor-wake time.

In accordance with an aspect of the present disclosure there is further provided a computer readable memory comprising instructions for extending a processor idle state in an electronic device, the instructions comprising instructions for determining that the processor can be placed into an idle state, instructions for setting a processor-wake time based on a timer schedule, instructions for masking a suspendable interrupt having a maximum-delay value, when a current time plus the maximum-delay value occurs after the set processor-wake time, and instructions for placing the processor into the idle state.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

In broad terms, interrupts may be used in electronic devices in order to notify a piece of software, such as an interrupt handler, of the occurrence of an external event. The software may then service the interrupt by performing some associated processing as required. If an interrupt occurs while a processor is executing instructions for some software, the execution may be pre-empted and switched to the software associated with the interrupt. If the processor is in the idle state it may be switched to a wake state and the software associated with the interrupt can be executed. The forgoing description does not consider many well known details including different priority levels that may be used in determining whether currently executing software should be halted if an interrupt is received. Some details of interrupts that are well known are omitted from the current description in order to highlight features of suspendable interrupts.

An interrupt signal arrives at an interrupt controller, which is typically implemented in a hardware component and may form part of the processor or may be separate from the processor. The interrupt controller receives the interrupt signal and generates an interrupt request. The interrupt request notifies the operating system (OS) that the interrupt has occurred. Once the interrupt has been raised it may be handled by software associated with the interrupt.

If an interrupt request is raised while the processor is in an idle state the processor is placed in a wake state and the interrupt request is serviced as appropriate. That is, an associated interrupt handler may be invoked for further processing. It is possible to associate a mask state with an interrupt. The mask state may be used to temporarily ignore an interrupt signal. The mask state of an interrupt may be either masked or unmasked. When an interrupt is unmasked and the associated interrupt signal is received at the interrupt controller it is processed as described above, that is the processor is placed in the wake state if previously idle, the interrupt request is raised and serviced. When the interrupt is masked, and the interrupt signal is received, the interrupt controller does not raise the interrupt request until it is unmasked, at which time it is serviced as described above. As such, if the interrupt signal associated with a masked interrupt occurs while the processor is in the idle state, the processor is not switched to the wake state in order to service the interrupt. Rather, the processor remains in the idle state until it is placed in the wake state due to some other action, such as execution of a scheduled timer. Once the processor is in the wake state, the OS may unmask any masked interrupts and if the associated interrupt signal has been received, the associated interrupt requests are raised and serviced.

As described further herein suspendable interrupts may be used in order to maintain the processor in the idle state for a longer period of time, while still allowing interrupt requests to be serviced in an appropriate amount of time. The 'appropriate' amount of time for servicing an interrupt request can vary and may depend on, among other factors, what the interrupt is used for. A suspendable interrupt is associated with a maximum delay value which is a maximum time that the software associated with the suspendable interrupt can wait between the interrupt signal for the interrupt being received and the interrupt being raised for servicing. The suspendable interrupt can be associated with its maximum delay value in various ways. For example the OS can provide an application programming interface (API) that allows software to be attached to, or associated with, a particular interrupt signal. The software attached to the interrupt signal through the suspendable interrupt may specify an interrupt handler that should be executed when the associated interrupt request is raised. The API interface, in addition to allowing the interrupt handler to be specified also allows the software to specify the maximum delay value of the suspendable interrupt. If other software is already associated with the suspendable interrupt, and so a maximum delay value already specified, the OS may determine if the requested maximum delay value is less then the current maximum delay value, and if it is the maximum delay value can be changed to the smaller value in order to satisfy the requirements of all software associated with the suspendable interrupt. Furthermore, the API can allow the maximum delay value associated with a suspendable interrupt to be changed. By providing a maximum delay value it is possible to suspend the raising of the suspendable interrupt and allow the processor to remain in an idle state for a longer period of time. If the processor is in the idle state while the interrupt signal is received, it may not be necessary to place the processor in the wake state immediately. Rather, if the processor will be placed in the wake state for another reason, such as expiration of a timer, within an amount of time less than the maximum delay value the raising of the suspendable interrupt may be suspend until the processor is placed in the wake state. However, it is not possible to determine if the processor will be placed in the wake state within the maximum delay value when the interrupt signal is received since the calculations required to do so would require placing the processor in the wake state. As such, the mask states of suspendable interrupts are set, as either masked or unmasked, before the processor is placed in the idle state.

Figure 2:
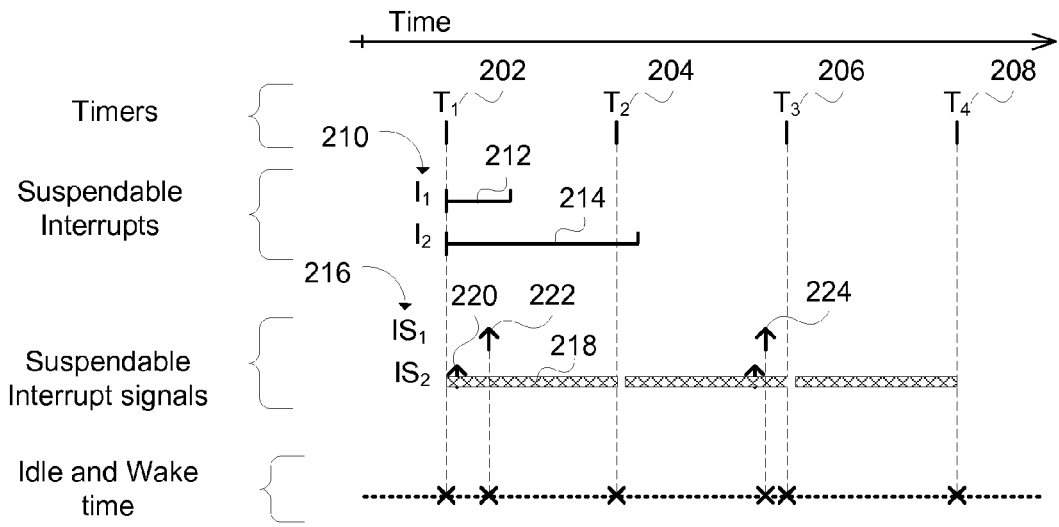
FIG. 2 depicts in a timeline, the occurrence of scheduled timer events and suspendable interrupts.
Figure 3:
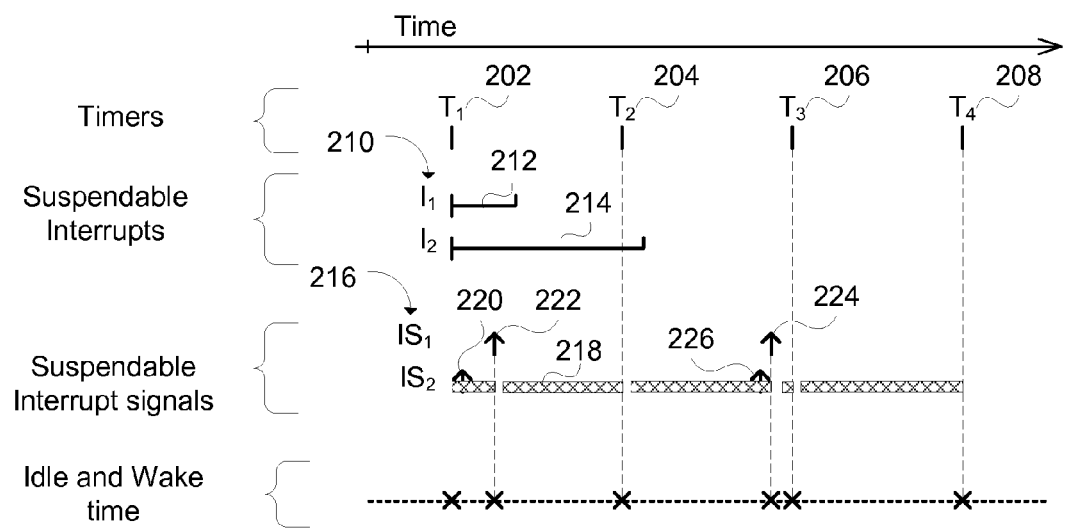
FIG. 3 depicts in a further timeline, the occurrence of scheduled timer events and suspendable interrupts.

FIG. 2 depicts a timeline of scheduled timer events and suspendable interrupts. The timers 202, 204, 206, 208 are scheduled by the OS and will cause the processor to switch from the idle state to the wake state. FIGS. 2 and 3 also depict the suspendable interrupts 210 that have been defined as well as their associated maximum delay values. In particular, two suspendable interrupts $I_1$ and $I_2$ are depicted with respective maximum delay values 212, 214 indicated. As is apparent from FIG. 2, if an interrupt signal of suspendable interrupt $I_1$ is received right after the processor is placed into the idle state following expiration of timer 202, the maximum delay value will not allow the suspendable interrupt $I_1$ from being suspended until the scheduled wake event 204. In contrast, regardless of when an interrupt signal of suspendable interrupt $I_2$ is received, the maximum delay value 214 will extend past the time at which timer 204 is scheduled to place the processor in the wake state. As a result, the suspendable interrupt $I_2$ may be masked until the next scheduled time 204 the processor is placed in the wake state.

Each suspendable interrupt 210 is associated with an interrupt signal 216. In particular suspendable interrupt I1 is associated with interrupt IS1 and particular suspendable interrupt I2 is associated with interrupt IS2. The suspendable interrupt $I_1$ is not masked and so when a corresponding interrupt signal IS1 is received, as indicated by arrow 222, while the processor is in the idle state, the interrupt request for suspendable interrupt $I_1$ is raised and the processor is placed in the wake state in order to service the suspendable interrupt $I_1$. The suspendable interrupt $I_2$ is masked, depicted by cross-hatching 218, and so when the interrupt signal IS2 is received, as indicated by arrow 220, while the processor is in the idle state, the interrupt request for suspendable interrupt $I_2$ is masked until the processor is placed in the wake state as a result of timer 204 expiring.

As depicted, even when the interrupt signal IS2 is received at a time, represented by arrow 224, that would allow it to be suspended until the processor is placed in the wake state due to timer 204 expiring within the maximum delay value, the interrupt request for suspendable interrupt $I_1$ is still raised, placing the processor in the wake state in order to service the suspendable interrupt $I_1$.

As described further herein, prior to placing the processor into the idle state the OS determines whether a suspendable interrupt should be masked until the next scheduled wake event. The masking of the suspendable interrupts is done on a worst-case scenario, assuming that the interrupt signal associated with the suspendable interrupt is received immediately after the processor is placed in the idle state. If it is possible to suspend raising the interrupt request for the worst case scenario, the suspendable interrupt is masked until the next scheduled wake event, otherwise the suspendable interrupt is unmasked.

FIG. 3 is substantially similar to FIG. 2. However, rather than waiting until the next scheduled wake time to raise a masked suspendable interrupt the masked suspendable interrupts are unmasked the next time the processor is placed in the wake state. As such, if the interrupt signal IS2 is received, at a time indicated by arrow 220, it remains masked until the interrupt signal IS1 is received, at the time indicated by arrow 222, and causes the processor to be placed in the wake state. Since interrupts are generally associated with processing that should be handled within a particular time frame, if multiple suspendable interrupts were suspended by their maximum delay value, when the processor is placed in the wake state there could be a backlog of suspendable interrupts, all of which have already been delayed by the maximum delay amount. When returning to the idle state after having serviced any raised interrupt requests associated with the suspendable interrupts, the OS again determines the masking state of each of the suspendable interrupts as described above utilizing the current time as the basis for the determination prior to proceeding to the idle state.

Figure 4:
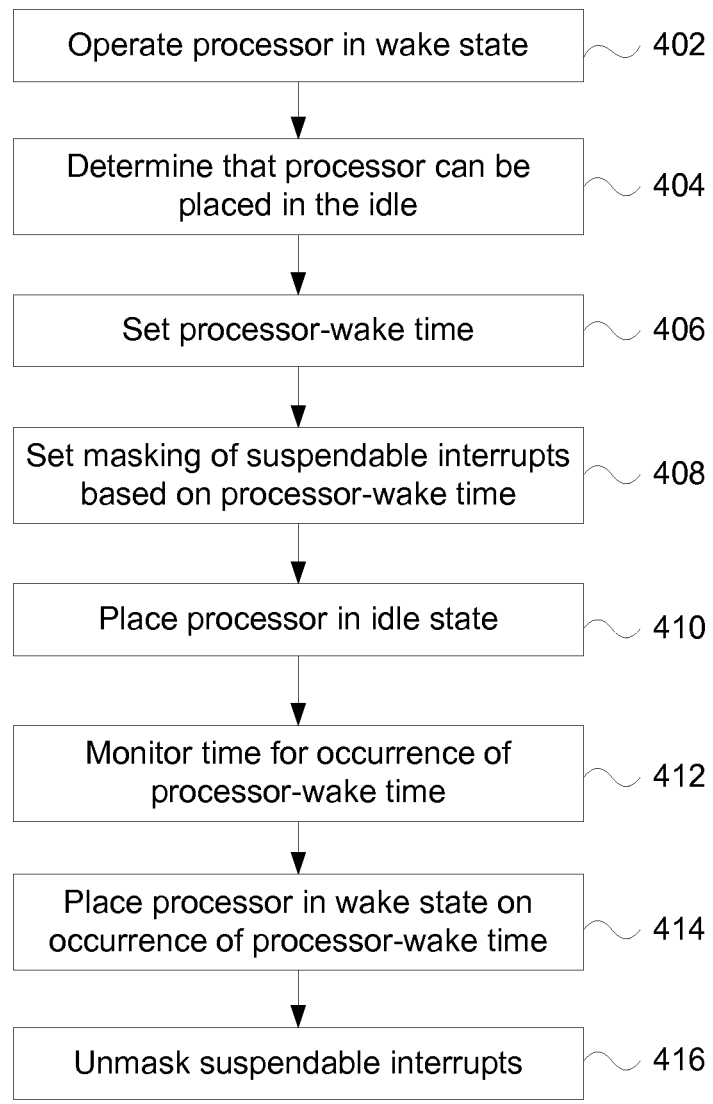
FIG. 4 depicts in a flow chart, a method of operating a processor with suspendable interrupts.

FIG. 4 depicts a flow chart of a method of operating a processor with suspendable interrupts. The method 400 operates the processor in the wake state (402). When there is no software that requires processing, it is determined that the processor may be placed in the idle state (404). Once it is determined that the processor can be placed in the idle state, a processor wake time is set (406). The processor wake time can be set based on one or more scheduled timers. The timer that occurs the earliest is set as the processor wake time. Once the processor wake time is set, the masking state of each suspendable interrupt, which have an associated maximum-delay value, is set based on the processor wake time (408). For each suspendable interrupt, it is determined if the current time plus the time of the maximum delay value associated with the respective suspendable interrupt occurs after (e.g. is later than) the set processor wake time, and if it does, the suspendable interrupt can be suspended until the processor is placed in the wake state at the scheduled processor wake time and so the suspendable interrupt is masked. If the current time plus the time of the maximum delay value associated with the respective suspendable interrupt occurs before (e.g. is earlier than) the processor wake time, the interrupt cannot be suspended until the scheduled processor wake time and so it is unmasked. Once the mask states for the suspendable interrupts are set, the processor is placed in the idle state (410). In the idle state the processor performs minimal processing. A time, based on a clock signal, is monitored for the occurrence of the processor wake time (412). Once the processor wake time occurs the processor is placed in the wake state (414). When the processor is in the wake state, it should handle the suspendable interrupts when they are raised, and as such, all masked suspendable interrupts are unmasked (416). When the processor is to be placed into the idle state again, the mask states of each of the suspendable interrupts are again determined against a new scheduled processor wake time for the processor and set accordingly.

FIG. 5a depicts a timer schedule table and a suspendable interrupt table. The timer schedule table 502 associates a trigger time with a respective timer. The scheduled timers may be specified at a periodic interval, or at times when software has requested a timer. Additionally, instead of specifying a specific triggering time, a timer may specify a time range during which the software associated with the timer may be triggered. Regardless of how the timer schedule is stored or specified, it is possible to determine a processor wake time based on the scheduled timers. In particular, the processor wake time will be set based on the earliest occurring timer that is required. As depicted in FIG. 5a, the processor wake time is set to 0.4 based on the trigger time of timer 2.

The suspendable interrupt table 504 depicts three suspendable interrupts and their associated maximum delay values. The mask state of each of the suspendable interrupts is based on the processor wake time from the scheduled timers of table 502. Since the processor wake time is 0.4 (assuming that the current time is 0) the current time plus the maximum delay value of both suspendable interrupts 1 and 2 occur after the processor wake time of 0.4. As such, both suspendable interrupts 1 and 2 are masked. The current time plus the maximum delay value of suspendable interrupt 3 is 0.3, which occurs before the processor wake time. As such, the suspendable interrupt 3 remains unmasked.

FIG. 5b depicts a timeline of the timers according to the timer schedule of table 502. FIG. 5b assumes no interrupt signals are received. At time 0, the mask state of each suspendable interrupt $I_1$, $I_2$ and $I_3$ are as depicted in table 504. At time 0.4 timer 2 expires 506, resulting in the processor being placed in the wake state. Once the processor is in the wake state all of the suspendable interrupts may be unmasked. When the processor is placed back into the idle state, which for simplicity is depicted as happening instantly, a new processor wake time is set. Continuing with the timers of table 502, the processor wake time would be set as 0.6, based on timer 1 508. Once the processor wake time is set, the masks of the suspendable interrupts are again determined. In this case, all suspendable interrupts $I_1$, $I_2$ and $I_3$ will be masked as depicted in FIG. 5b. Similarly, once the processor is to be placed back into the idle state at time 0.6, the processor wake time is set as 1.5 510 and the masks of the suspendable interrupts $I_1$, $I_2$ and $I_3$ determined. In this case, suspendable interrupt $I_2$ may be hindered long enough to guarantee that regardless of how soon the associated interrupt signal is received the interrupt can be suspended until timer 3 expires. As such suspendable interrupts 1 and 3 are unmasked and suspendable interrupt 2 is masked.

FIG. 5c depicts the same initial arrangement as described above with reference to FIG. 5b. However, at time 0.1 an interrupt signal 512 associated with suspendable interrupt 3 is received. Since suspendable interrupt 3 is unmasked, the processor is placed in the wake state and the interrupt request for suspendable interrupt 3 is raised serviced once the interrupt signal 512 is received. Once the processor is to be placed back into the idle state, the processor wake time, and the mask state of the suspendable interrupts $I_1$, $I_2$ and $I_3$ is again determined. As depicted, all of the suspendable interrupts $I_1$, $I_2$ and $I_3$ are masked. The processor wake time will be 0.4, and the current time will be 0.1. For each suspendable interrupt $I_1$, $I_2$ and $I_3$, the current time plus the maximum delay value will occur after, or at the same time as, the processor wake time. As such, all of the suspendable interrupts $I_1$, $I_2$ and $I_3$ can be masked, and if any interrupt signals are received, the handling of the associated interrupt can be suspended until the processor is placed in the wake state due to the timer T1 508 expiring. Following expiration of the timer, the processor wake time and mask states for the suspendable interrupts will be determined as described above with FIG. 5b.

Figure 6:
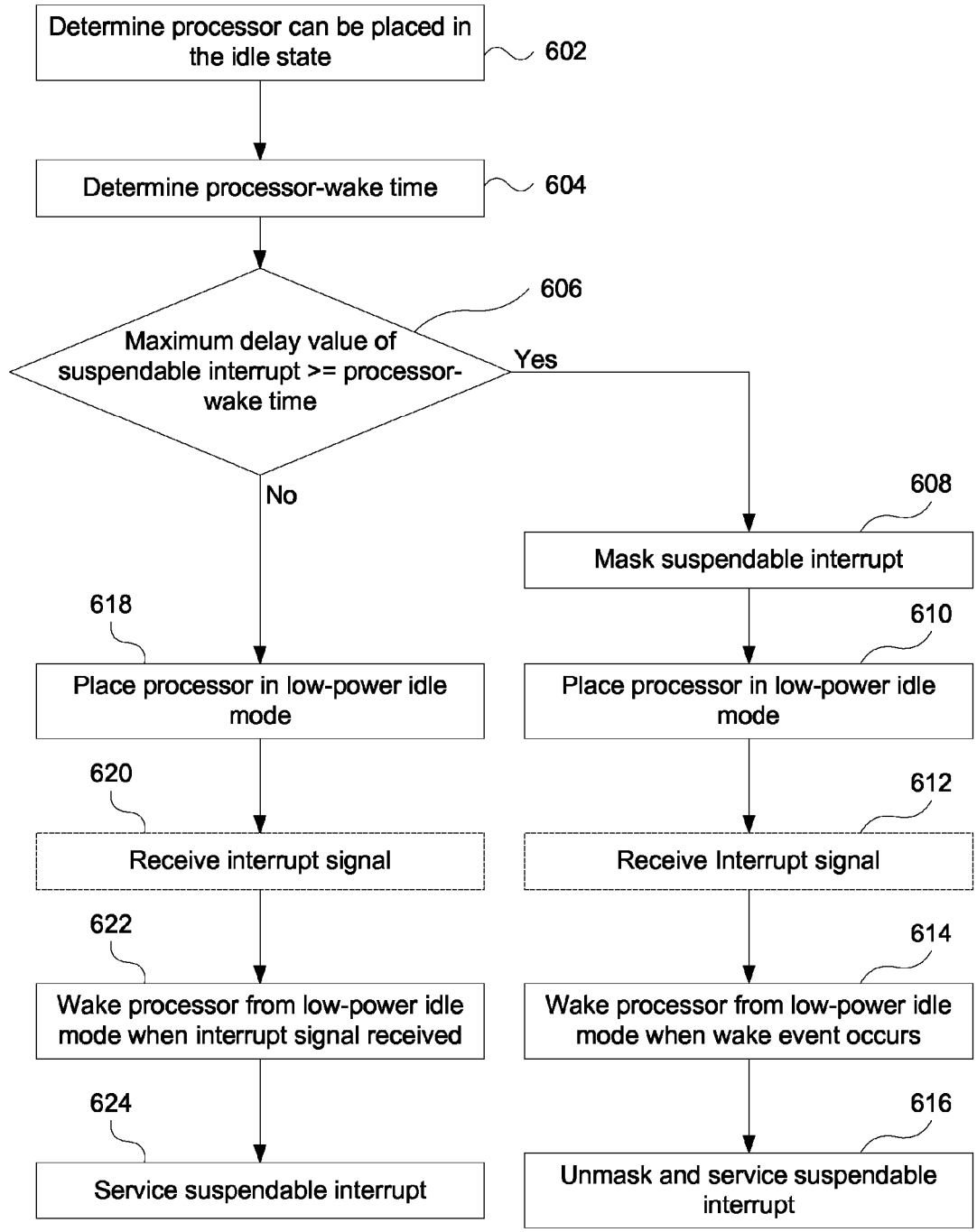
FIG. 6 depicts in a flow chart, of a further method of operating a processor with suspendable interrupts.

FIG. 6 depicts a flow chart of a method of operating a processor in accordance with the suspendable interrupts described herein. The method 600 determines that the processor can be placed in the idle state (602). The determination that the processor can be placed in the idle state may be made in various ways. For example, the method may determine that there is no software currently running that requires processing by the processor. Additionally or alternatively, the determination may be made by receiving an indication that the processor can be placed in the idle state. The indication may be a direct indication to place the processor in the idle state, such as a function call that places the processor in the idle state. Regardless of how the determination that it is possible to place the processor in the idle state, once the determination is made and before placing the processor into the idle state, the method sets the processor wake time (604) based on scheduled timers. The processor wake time sets the time the processor will be placed into the wake state, assuming no interrupt signals are received. Once the processor wake time is set, a suspendable interrupt is checked to determine if it can be masked. The current time plus the maximum delay time of the suspendable interrupt is checked against the set processor wake time to see if the sum occurs after, or at the same time as, the set processor wake time (606). In FIG. 6 the 'greater than' sign is used for brevity in place of 'occurs after'. If the current time plus the maximum delay value of the suspendable interrupt does occur after the set processor wake time (Yes at 606), the suspendable interrupt is masked (608) and the processor is placed in the idle state (610). At some time before the processor wake time, an interrupt signal associated with the suspendable interrupt may be received (612). Since the suspendable interrupt is masked, the raising of the associated interrupt request and servicing of the suspendable interrupt is suspended. Once the processor wake time occurs, the processor is placed in the wake state (614) and the suspendable interrupt is unmasked (616) resulting in the interrupt request for the suspendable interrupt being raised, if the interrupt signal was received at 612, and serviced.

If it is determined that the current time plus the maximum delay value occurs before the processor wake time (No at 606), the suspendable interrupt is unmasked (618) and the processor placed in the idle state. At some time before the processor wake time, the interrupt signal associated with the suspendable interrupts may be received (620). Since the suspendable interrupt is unmasked, the processor is placed in the wake state (622) if the interrupt signal was received at 620. Once in the wake state the interrupt request for the suspendable interrupt is raised and serviced (624).

FIG. 6 describes a method of operating a processor in accordance with a single suspendable interrupt. Multiple suspendable interrupts may be used. If multiple suspendable interrupts are used, after setting the processor wake time, the respective mask state of each of the multiple suspendable interrupts is set and then the processor placed in the idle state.

Figure 7:
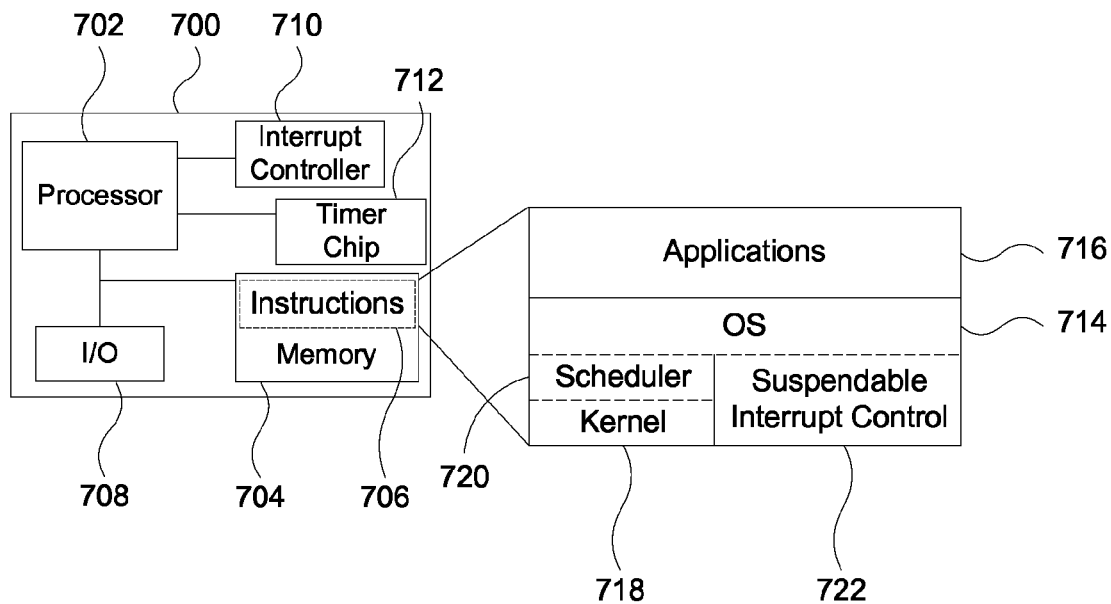
FIG. 7 depicts in a block diagram an electronic device comprising a suspendable interrupt control.

FIG. 7 depicts in a block diagram an electronic device in which the suspendable interrupts described herein are implemented. The electronic device 700 may be handheld battery powered device using one or more processors such as for example a mobile phone, smart-phone, tablet device, laptop, or net-top computer. Although the illustrative electronic device 700 is described as a handheld battery powered device, the suspendable interrupts may be used in alternative electronic devices including desktop computers, set-top boxes, routers etc. Regardless of the specific use for the electronic device 700, it comprises a central processing unit 702 for executing instructions, a memory 704 for storing instructions 706 to be executed by the processing unit 702. The electronic device 700 may also comprise one or more input/output (I/O) devices 708, for example a display screen, a keyboard, a touch screen, a network interface or a wireless communication interface. The electronic device 700 further comprises an interrupt controller 710. Although depicted separately from the processor 702 of the electronic device 700, the interrupt controller 710 may be incorporated into the processor 702 or other chipset providing input/output controller functions. The device 700 further comprises a timer chip 712. The timer chip 712 may generate, or receive from another source, timing pulses that are used as a time-base for the timers. The timer chip 712 may monitor the timing pulses and provide a wake signal, which may include for example an interrupt signal, at a time, such as the processor wake time. It is contemplated that the timer chip 712 could be incorporated into the processor 702 or combined with other components of the electronic device 700. The instructions 706, when executed by the processing unit 702, provide various functionality to the electronic device 700, including an OS 714 which can provide an environment for running applications 716. The OS 714 may comprise a kernel 718 comprising core functionality of the OS 714. The OS 714 may also comprise the suspendable interrupt control 722 providing the suspendable interrupt functionality described here. The suspendable interrupt control 722 may be a part of the kernel 718, a part of the OS 714 apart from the kernel 718, an application 716 running on the OS 714 or a combination thereof.

The description of the timers and suspendable interrupts has described placing the processor 702 into an idle state when there is no software requiring processing. The time and time ranges described with regards to the timers and interrupts has been described using an arbitrary time scale for clarity of the description. It is contemplated that the actual time scales used by timers and the maximum delay value of the suspendable interrupts will vary based on one or more of the precision of the timing provided by the timer chip 712, the precision of the processor 702 or electronic device 700, the precision of time within the OS 712 and the requirements of the software associated with the suspendable interrupt.

'Software' has been described generally for clarity of the description with regards to the functioning of the suspendable interrupts. 'Software' is intended to include one or more applications 716 running on the OS 714, the OS 714 itself, a portion of an application 716 or a portion of the OS 714 including the kernel 718 or scheduler 720 or other OS components, or other elements of the electronic device that can be executed on the processor 702.

Individual applications 716, portions of the applications 716, or portions of the OS 714 may execute in a separate thread or process. Since a processor 702 may only process a limited number of threads or processes at a time, a component of the OS 714 typically forming part of the kernel 714 and referred to as a scheduler 720 is responsible for scheduling which process or thread will execute on the processor 702 at a particular time. The scheduler 720 may also be responsible for setting the processor wake time for the processor 702 and placing the processor 702 into the idle state. When the processor 702 returns to the wake state from the idle state, the scheduler 720 determines which of the processes or threads will be executed, including checking to determine if any suspendable interrupts occurred that need to be raised and handled.

A processor may comprise one or more processing cores that can each execute a process or thread independently from the other cores. A scheduler may assign a process or thread to execute on any of the processing cores at any point in the execution of the process or thread. Alternatively, a process or thread may be assigned to always execute on the same processing core. The scheduler may place the individual processing cores into the idle state independently.

Although the processor has been described as having two states, namely a wake state and an idle state, the tolerant timers may be applied to processor which may operate in more than two states. Furthermore, the suspendable interrupts may be combined with one or more types of interrupts provided by the OS. Regardless of the type of interrupt, the scheduler may determine and set, based on one or more parameters, such as for example a power mode of the electronic device, the processor-wake time and the mask state of interrupts based on available interrupt information.

Although the above discloses example methods, apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

What is claimed is:

1. A method of extending a processor idle state in an electronic device, the method comprising:
    determining that the processor can be placed into an idle state;
    setting a processor-wake time based on a timer schedule;
    masking a suspendable interrupt having a maximum-delay value, when a current time plus the maximum-delay value occurs after the set processor-wake time; and
    placing the processor into the idle state.

2. The method of claim 1, wherein the maximum delay value defines a maximum acceptable time between receiving at an interrupt controller an interrupt signal associated with the suspendable interrupt and servicing the suspendable interrupt.

3. The method of claim 1, further comprising:
    setting a mask state for each suspendable interrupt of a plurality of suspendable interrupts, wherein the mask state of each suspendable interrupt is set as:
        masked when a current time plus the respective maximum-delay value occurs after the processor-wake time; and
        unmasked when a current time plus the respective maximum-delay value occurs before the processor-wake time.

4. The method of claim 3, further comprising changing the respective maximum-delay value associated with at least one of the plurality of suspendable interrupts.

5. The method of claim 3, further comprising:
    monitoring a time based on a clock signal while the processor is in the idle state;
    receiving an interrupt signal associated with a suspendable interrupt that is masked;
    determining that the monitored time is equal to the processor-wake time;
    placing the processor in a wake state;
    unmasking the suspendable interrupt that is masked; and
    processing the suspendable interrupt associated with the received interrupt signal.

6. The method of claim 5, further comprising:
    unmasking any masked suspendable interrupt when the processor is placed in the wake state;
    processing any of the unmasked suspendable interrupts if an associated interrupt signal has been received.

7. The method of claim 3, further comprising:
    monitoring a time based on a clock signal while the processor is in the idle state;
    receiving an interrupt signal associated with a suspendable interrupt that is unmasked;
    placing the processor in a wake state; and
    processing the suspendable interrupt associated with the received interrupt signal.

8. The method of claim 7, further comprising:
    unmasking any masked suspendable interrupt when the processor is placed in the wake state;
    processing any of the unmasked suspendable interrupts if an associated interrupt signal has been received.

9. An electronic device comprising:
    a processor executing instructions;
    a memory storing instructions for execution by the processor, the instructions when executed by the processor configuring the electronic device to provide:
        an operating system for setting a processor-wake time, before the processor is placed into an idle state, based on a timer schedule and placing the processor into the idle state; and
        a suspendable interrupt control for masking a suspendable interrupt having a maximum-delay value, when a current time plus the maximum-delay value occurs after the set processor-wake time.

10. The electronic device of claim 9, wherein the maximum-delay value defines a maximum acceptable time between receiving at an interrupt controller an interrupt signal associated with the suspendable interrupt and servicing the suspendable interrupt.

11. The electronic device of claim 9, the suspendable interrupt control is further for setting a mask state for each suspendable interrupt of a plurality of suspendable interrupts, wherein the mask state of each suspendable interrupt is set as:
    masked when a current time plus the respective maximum-delay value occurs after the processor-wake time; and
    unmasked when a current time plus the respective maximum-delay value occurs before the processor-wake time.

12. The electronic device of claim 11, wherein the operating system is further for changing the respective maximum-delay value associated with at least one of the plurality of suspendable interrupts.

13. The electronic device of claim 11, further comprising:
    an interrupt controller for receiving an interrupt signal associated with a suspendable interrupt; and
    a timer chip for monitoring a time based on a clock signal while the processor is in the idle state, determining that the monitored time is equal to the processor wake time and placing the processor in a wake state when the processor wake time occurs,
    wherein the processor is placed in the wake state upon the interrupt controller receiving, before the processor wake time, an interrupt signal associated with a suspendable interrupt that is unmasked.

14. The electronic device of claim 13, further comprising:
    an interrupt controller for receiving an interrupt signal associated with a suspendable interrupt and placing the processor in a wake state; and
    a timer chip for monitoring a time based on a clock signal while the processor is in the idle state, determining that the monitored time is equal to the processor wake time and placing the processor in the wake state when the processor wake time occurs, and wherein the interrupt controller suspends placing the processor in the wake state when the interrupt controller receives an interrupt signal associated with a suspendable interrupt that is masked.

15. The electronic device of claim 14, wherein the suspendable interrupt control is further for:
   unmasking any masked suspendable interrupt when the processor is placed in the wake state;
   processing any of the unmasked suspendable interrupts if an interrupt signal associated with a respective suspendable interrupt has been received.

16. A computer readable memory comprising instructions for extending a processor idle state in an electronic device, the instructions comprising:
   instructions for determining that the processor can be placed into an idle state;
   instructions for setting a processor-wake time based on a timer schedule;
   instructions for masking a suspendable interrupt having a maximum-delay value, when a current time plus the maximum-delay value occurs after the set processor-wake time; and
   instructions for placing the processor into the idle state.

17. The computer readable memory of claim 16, wherein the maximum delay value defines a maximum acceptable time between receiving at an interrupt controller an interrupt signal associated with the suspendable interrupt and servicing the suspendable interrupt.

18. The computer readable memory of claim 16, further comprising:
   instructions for setting a mask state for each suspendable interrupt of a plurality of suspendable interrupts, wherein the mask state of each suspendable interrupt is set as:
      masked when a current time plus the respective maximum-delay value occurs after the processor-wake time; and
      unmasked when a current time plus the respective maximum-delay value occurs before the processor-wake time.

19. The computer readable memory of claim 18, further comprising instructions for changing the respective maximum-delay value associated with at least one of the plurality of suspendable interrupts.

20. The computer readable memory of claim 18, further comprising:
   instructions for monitoring a time based on a clock signal while the processor is in the idle state;
   instructions for receiving an interrupt signal associated with a suspendable interrupt that is masked;
   instructions for determining that the monitored time is equal to the processor-wake time;
   instructions for placing the processor in a wake state;
   instructions for unmasking the suspendable interrupt that is masked; and
   instructions for processing the suspendable interrupt associated with the received interrupt signal.

21. The computer readable memory of claim 20, further comprising:
   instructions for unmasking any masked suspendable interrupt when the processor is placed in the wake state;
   instructions for processing any of the unmasked suspendable interrupts if an associated interrupt signal has been received.

22. The computer readable memory of claim 18, further comprising:
   instructions for monitoring a time based on a clock signal while the processor is in the idle state;
   instructions for receiving an interrupt signal associated with a suspendable interrupt that is unmasked;
   instructions for placing the processor in a wake state; and
   instructions for processing the suspendable interrupt associated with the received interrupt signal.

23. The computer readable memory of claim 22, further comprising:
   instructions for unmasking any masked suspendable interrupt when the processor is placed in the wake state;
   instructions for processing any of the unmasked suspendable interrupts if an associated interrupt signal has been received.

* * * * *